M. FAISTENHAMMER.
HAM HOOK.
APPLICATION FILED AUG. 23, 1919.
1,360,104.
Patented Nov. 23, 1920.
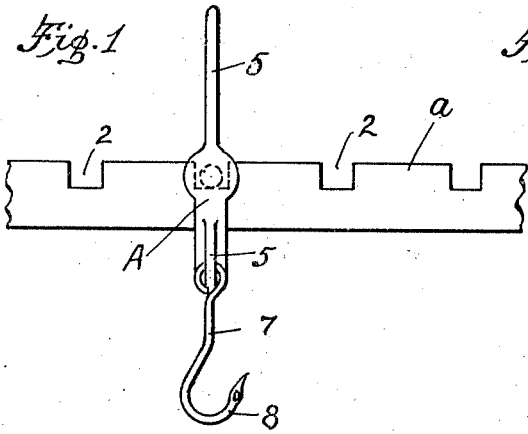
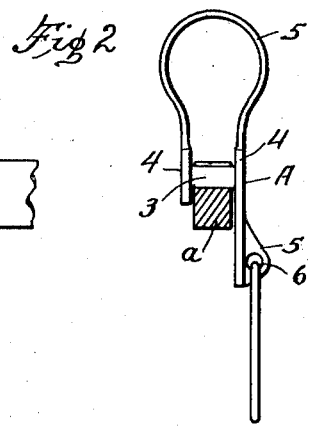
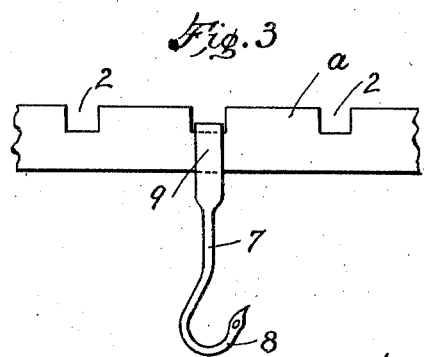
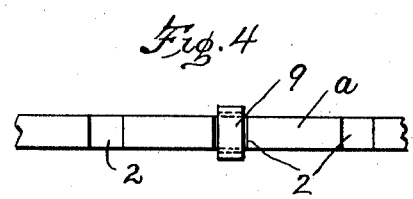
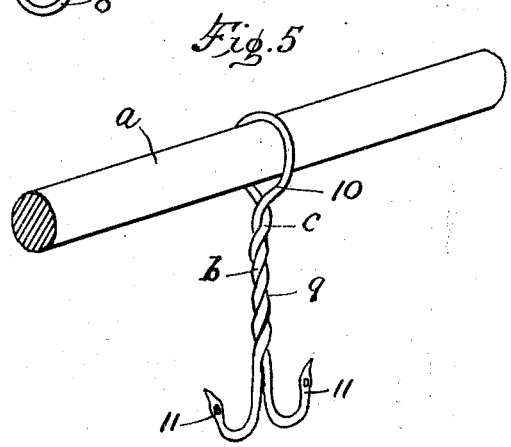
Inventor
Max Faistenhammer
By
F. N. Gilbert
Attorney.

UNITED STATES PATENT OFFICE.

MAX FAISTENHAMMER, OF BINGHAMTON, NEW YORK.

HAM-HOOK.

1,360,104.     Specification of Letters Patent.     Patented Nov. 23, 1920.

Application filed August 23, 1919. Serial No. 319,387.

*To all whom it may concern:*

Be it known that I, MAX FAISTENHAMMER, a citizen of the United States, residing at Binghamton, in the county of Broome and State of New York, have invented certain new and useful Improvements in Ham-Hooks, of which the following is a specification.

My invention relates to improvements in hooks or members for the suspension of hams and similar products from the meat sticks and in butcher shops after being smoked. In the handling of hams in shops and store houses, they are hung on hooks suspended from racks usually. The rails are sometimes notched so as to space the hooks. In hanging the articles, the hooks are formed so as to be removable hooks on the rail. It is desirable to have a hook which can be removed from the rails, when necessary and weighted with ease; also a hook which will hang in a spaced notch on the rail and will permit the hams being hung so as to be easily removed, also firm in position so as not to contact with each other, when required, and so as to hang securely in the notch of the rail, and which at the same time afford the opportunity for hanging the greatest amount of weight in a given space. Also a hook, which at the same time may be readily removed, when weighted with the meat.

In the device Figure 1 is a side view of the preferred form of my invention.

Fig. 2 is an end view of the preferred form of my invention.

Fig. 3 is a side view of a modified form of my invention.

Fig. 4 is a plan view of a modified form of my invention.

Fig. 5 is a perspective view of a modified form of my invention.

The same reference characters denote like parts in each of the several figures of the drawings. In the drawings *a* represents the rail having the notches 2, 2, etc. In the preferred form of my device, I have hook A formed with the pivot 3, and on each end of which are the guards 4, 4, and having mounted thereon bail 5. On the face of guard 4, I have the projecting lug 5', having through it the opening 6 therein and in which is hung hook 7 in alinement with rail *a*, which hook has the usual sharpened hook portion 8. In the modified form of my device I have the hook 7 having the usual sharpened hook portion at its lower end 8 and the flattened rebent portion 9 at its upper end. The rebent portion 9 is a flattened surface and is rectangular as shown in Figs. 3 and 4. The flat rectangular surface enables the hook to fit snugly and squarely within the notch 2 and on the rail and which prevents lateral movements and prevents its removal from the rail, when the meat is being removed.

In a further modified form of my device, referring to the drawing, the device will be seen to comprise a shank 9 preferably provided at one end with an eye by means of which it may be suspended in any suitable manner from a rod, rail or other support *a*.

Also the end of the shank is forked and projects into two hook members 11, 11. The simple form of construction preferably is a single piece of wire rod bent at the middle to form eye 10 and then twisted together and forms the shank, after which the two strands of the wire may be separated to form the two hook members; and in each hook point thereof, there is an eye adapted to receive a tie cord.

Having thus described my invention, what I claim as new and for which I desire Letters Patent is as follows:

A meat hanger comprising a hook, and suspending means for the hook comprising a bail having its side arms extended to provide side bars for extending upon opposite sides of a supporting bar, and a cross-pin connecting the side bars and constituting a pivot pin for fitting into a notch in the supporting bar to pivotally mount the meat hanger and hold the same against sliding movement longitudinally of the supporting bar, the meat engaging hook being carried by one of the side bars.

In testimony whereof I have affixed my signature.

MAX FAISTENHAMMER.